United States Patent [19]

Tsuchiya

[11] 4,119,670

[45] Oct. 10, 1978

[54] PROCESS AND REACTOR FOR PREPARING ETHANOLAMINES

[75] Inventor: Michio Tsuchiya, Hiratsuka, Japan

[73] Assignee: Nippon Shokubai Kagaku Kogyo Co., Ltd, Osaka, Japan

[21] Appl. No.: 814,686

[22] Filed: Jul. 11, 1977

[30] Foreign Application Priority Data

Jul. 15, 1976 [JP] Japan .................. 51/83527

[51] Int. Cl.$^2$ .................. C07C 85/145; B01D 3/02
[52] U.S. Cl. .................. 260/585 C; 422/208; 422/234; 422/236
[58] Field of Search .............. 23/260, 263; 260/585 C, 260/585 R

[56] References Cited

U.S. PATENT DOCUMENTS

| | | | |
|---|---|---|---|
| 2,977,197 | 3/1961 | Adams et al. .................. | 23/193 |
| 3,006,908 | 10/1961 | Dye .................. | 23/263 X |
| 3,008,807 | 11/1961 | Hilgert et al. .................. | 23/260 |
| 3,411,866 | 11/1968 | Jewell .................. | 23/263 X |
| 3,418,081 | 12/1968 | Graver et al. .................. | 23/263 X |
| 3,431,079 | 3/1969 | Chapman .................. | 23/260 |
| 3,472,630 | 10/1969 | Baldwin et al. .................. | 23/263 X |
| 3,600,136 | 8/1971 | Giolito et al. .................. | 23/260 |
| 3,723,530 | 3/1973 | Goetze et al. .................. | 260/584 R |
| 3,732,266 | 5/1973 | Dudrow et al. .................. | 23/263 X |
| 3,849,262 | 11/1974 | Cocuzza .................. | 260/584 R X |

Primary Examiner—Winston A. Douglas
Assistant Examiner—John J. Doll
Attorney, Agent, or Firm—Sherman & Shalloway

[57] ABSTRACT

Ethanolamines are prepared by the reaction of ethylene oxide with ammonia, using an apparatus consisting of a reactor (A) comprising a vertical multitube heat exchanger type reaction chamber 20 composed of a shell plate 9, a top tube plate 10a, a bottom tube plate 10b and tubes 11 and including buffer plates 18 within a shell-side space 15; a gas-liquid separating drum 12 located over the top tube plate 10a of the reaction chamber 20; a circulating pipe 14 connecting the gas-liquid separating drum 12 to a bottom space 32 leading to a tube-side space 13 of the reaction chamber 20; an ammonia solution-introducing tube 8 and a plurality of ethylene oxide-introducing tubes 19, which are both provided so as to be opened into the shell-side space 15 of the reaction chamber 20; and a conduit 16 connecting the shell-side space 15 of the reaction chamber 20, the bottom space 32 of the reaction chamber 20 and the gas-liquid separating drum 12 and pressure control valve 17a and valve 17b provided in the path of the conduit 16; an ammonia desorption tower (B); and an ammonia absorption tower (C).

8 Claims, 1 Drawing Figure

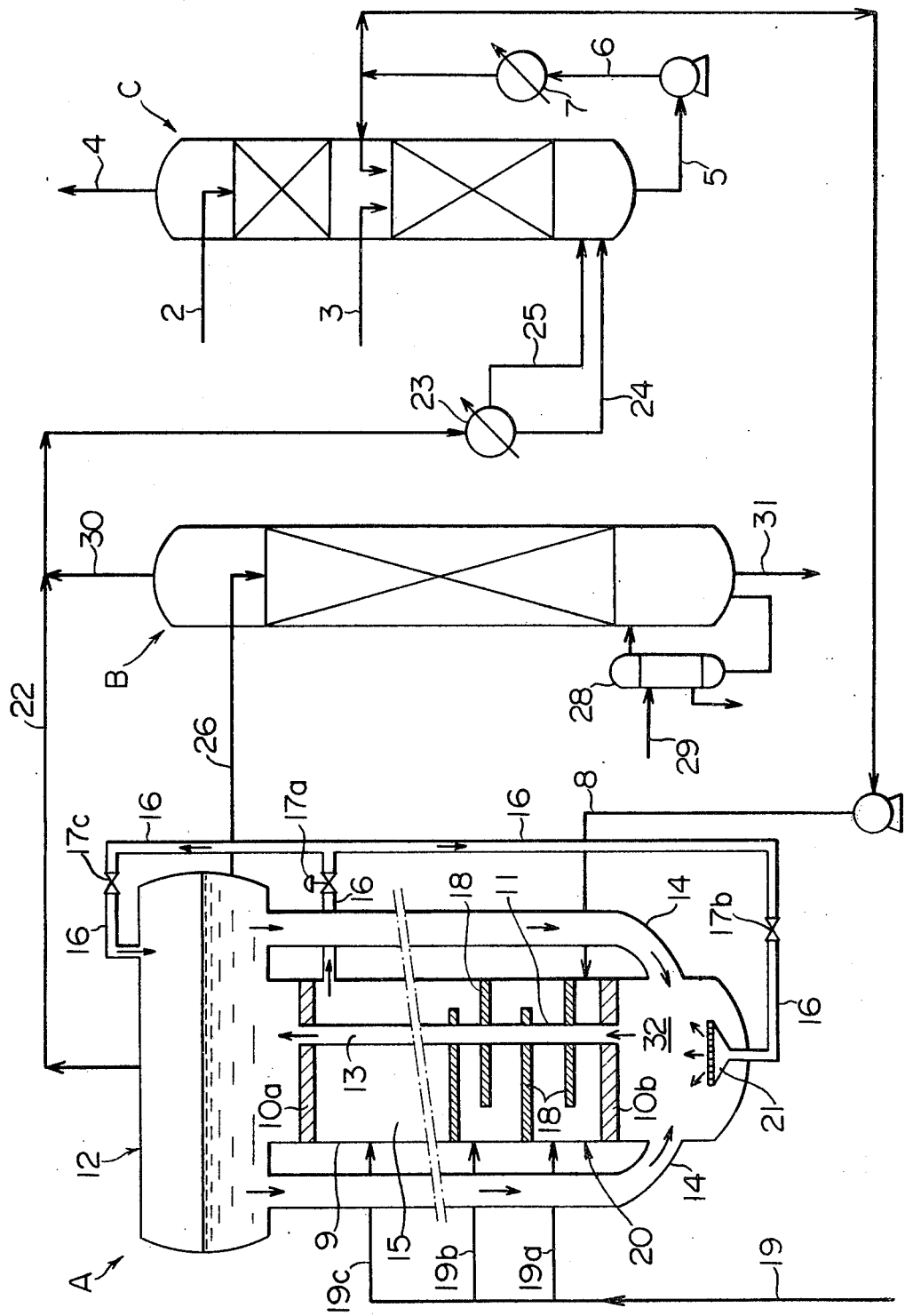

PROCESS AND REACTOR FOR PREPARING ETHANOLAMINES

This invention relates to a process for preparing ethanolamines by reacting ethylene oxide with ammonia, and a reactor used for performing the process. From another viewpoint, the invention relates to a process for effectively recovering the heat of reaction and the unreacted ammonia in the reaction of ethylene oxide with ammonia.

Ethanolamines find a wide range of applications as detergents, emulsifiers, gas absorbents, corrosion inhibitors, gloss-imparting agents, polishes, textile treating assistants, and raw materials for herbicides, pharmaceuticals, etc.

Ethanolamines can be produced by the reaction of ethylene halohydrins or ethylene oxide with ammonia, but the current commercial-scale production of ethanolamines almost entirely relies on the reaction of ethylene oxide with ammonia.

The reaction of ethylene oxide addition to ammonia is consecutive, and successively yields monoethanolamine (MEA), diethanolamine (DEA) and triethanolamine (TEA). Accordingly, the ratios of the ethanolamines in the reaction product is determined by the mole ratio of ethylene oxide to ammonia. For example, to obtain a reaction product containing a major proportion of MEA and/or DEA, a large excess of ammonia should be reacted with ethylene oxide. This procedure requires a heating source, for example a large quantity of steam, to recover the excess of ammonia after the reaction.

The addition reaction between ethylene oxide and ammonia is an exothermic reaction, and heat is generated from the reaction in an amount of 23 to 26 Kcal per mole of ethylene oxide. For example, when ethylene oxide and ammonia in a mole ratio of 0.3 are reacted adiabatically the temperature rises by 100° to 150° C. It is also known that when ethylene oxide and ammonia are reacted at a higher mole ratio, the temperature rises by 200° to 300° C. In known processes using reactors with shell and tubes, it is the common practice to cool the outside of a reaction zone with cooling water, etc. so as to restrict the reaction temperature to 50° to 150° C. According to this practice, however, a greater portion of the heat of reaction is discarded together with the cooling water, etc., and the recovery of heat is insufficient. As another method for recovering the heat of reaction, it is known to react ethylene oxide and ammonia adiabatically, and desorb the ammonia by releasing the elevated pressure. Since the inside of the reactor attains high temperatures and pressures, a large-scale apparatus is required, and the resulting ethanolamines, especially TEA, tend to be colored.

It is an object of this invention therefore to provide an advantageous process for preparing ethanolamines, which makes it possible to effectively recover the heat of reaction and the unreacted ammonia in the reaction of ethylene oxide with ammonia.

Another object of the invention is to provide a reactor which makes possible the advantageous production of ethanolamines.

Other objects of the invention will become apparent from the following description.

The present inventor has found that a novel reactor (A) comprising the following constituent elements (i) to (v) achieves the above objects.

(i) A reaction chamber 20 of a vertical multitube heat exchanger type composed of a shell plate 9, a top tube plate 10a, a bottom tube plate 10b and tubes 11 and including buffer plates 18 in a shell-side space 15;

(ii) a gas-liquid separating drum 12 located over the top tube plate 10a of the reaction chamber 20;

(iii) a circulating pipe 14 connecting the gas-liquid separating drum 12 and a bottom space 32 leading to a tube-side space 13 of the reaction chamber 20;

(iv) a tube 8 for introducing ammonia solution and a plurality of tubes 19 for introducing ethylene oxide, the tubes 8 and 19 being opened into the shell-side space 15 of the reaction chamber 20; and (v) a conduit 16 connecting the shell-side space 15 of the reaction chamber 20, the bottom space 32 of the reaction chamber 20, and the gas-liquid separating drum 12, and a pressure control valve 17a within the passageway of the conduit 16.

Thus, according to the present invention, a process for preparing ethanolamines comprising the steps [I] to [IX] shown below is provided on the basis of the invention of the novel reactor (A).

[I] Using an apparatus resulting from the connection of an ammonia desorption tower (B) and an ammonia absorption tower (C), both of conventional types, to reactor (A);

[II] introducing ammonia solution and ethylene oxide into the shell-side space 15 through the introducing tube 8 and the introducing tubes 19a, 19b, 19c, respectively and thereby reacting ammonia with ethylene oxide in the shell-side space 15;

[III] conducting the reaction product mixture by the conduit 16 from the shell-side space 15 to the bottom space 32 of the reaction chamber 20 through the pressure control valve 17a and valve 17b, then conducting it to the gas-liquid separating drum 12 through the tube-side space 13, and separating it into a gas and a liquid in the drum 12; or instead, conducting a part of the reaction product mixture by the conduit 16 from the shell-side space 15 to the gas-liquid separating drum 12 through the pressure control valve 17a and valve 17c, separating it into a gas and a liquid in the gas-liquid separating drum 12, conducting the remainder of the reaction product mixture by the conduit 16 from the shell side space 15 to the bottom space 32 of the reaction chamber 20 through the pressure control valve 17a and valve 17b, then conducting it to the gas-liquid separating drum 12 through the tube-side space 13, and separating it into a gas and a liquid in the gas-liquid separating drum 12;

[IV] circulating a part of the liquid separated in the gas-liquid separating drum 12 by a thermosiphoning action through the circulating pipe 14, the bottom space 32, and the tube side space 13;

[V] sending the remainder of the liquid separated in the gas-liquid separating drum 12 from the chamber 20 to the ammonia desorption tower (B);

[VI] sending the vapor evolved from the top of the ammonia desorption tower (B) to the ammonia absorption tower (C);

[VII] sending the liquid issued from the bottom of the ammonia desorption tower (B) to a step of purifying the ethanolamines;

[VIII] sending the vapor separated in the gas-liquid separating drum 12 to the ammonia absorption tower (C); and

[IX] introducing the ammonia solution formed in the ammonia absorption tower (C) as a reacting material from the ammonia solution-introducing tube 8 to the shell-side space 15 of the reaction chamber 20.

According to the process of this invention, ethanolamines are prepared by reacting ethylene oxide and ammonia in the liquid phase. The starting reaction mixture in the reaction chamber contains 1 to 50 moles, preferably 1.5 to 20 moles, of ammonia per mole of ethylene oxide. Ammonia is introduced into the shell-side space of the reaction chamber as an aqueous solution having a concentration of generally 15 to 50% by weight, preferably 25 to 45% by weight. The reaction temperature is 60 to 180° C., preferably 90° to 150° C., and the reaction pressure is 1 to 100 kg/cm$^2$.G, preferably 5.5 to 50 kg/cm$^2$. G. The residence time of the reaction mixture in the shell-side space is 1 to 60 minutes, preferably 2 to 10 minutes.

Steam and Dowtherm (a trademark for a heat-transfer medium, a product of Dow Chemical Co.) are examples of the heating source for the ammonia desorption tower. Usually, steam is employed.

The process of this invention obviates the need for cooling water which the conventional processes using a multitube shell-and-tube type reactor require for cooling the reaction zone. Moreover, the process can drastically reduce heating in the ammonia desorption tower, and can afford highly pure ethanolamines in high yields.

The accompanying drawing is a schematic side view showing the arrangement of the reactor (A), ammonia desorption tower (B) and ammonia absorption tower (C) in a preferred apparatus for performing the process of the invention.

A preferred embodiment of the invention is described below with reference to this drawing.

Water at a temperature of 30° C. or below is fed into the top stage of an ammonia absorption tower (C) through a conduit 2, and ammonia solution is fed into the middle stage of the tower through a conduit 3. A gas substantially free from ammonia is released from the top of the ammonia absorption tower (C) through a conduit 4. The liquid (ammonia solution) at the bottom of the ammonia absorption tower (C) is fed from the ammonia solution introducing tube 8 to the bottom portion of the shell-side space 15 of the reactor (A) through conduits 5 and 6 and a cooler 7 which is cooled by cooling water at 30° C. or below. The shell-side space 15 is a space defined by the inside surface of a shell plate 9, the under surface of a top tube plate 10a, the upper surface of a bottom plate tube 10b and the outside surfaces of a number of tubes 11, and constitutes the principal part of a reaction chamber 20. At least one buffer plate 18 is provided, preferably in the horizontal direction, in the shell-side space 15.

Ethylene oxide is fed into the shell-side space 15 through an ethylene oxide-introducing tube 19. In order to avoid the formation of localities which attain high temperatures as a result of the reaction of ethylene oxide with ammonia, the feeding of ethylene oxide into the shell-side space 15 is performed by a plurality of tubes (for example, 19a, 19b, 19c). These tubes (19a, 19b, 19c) preferably have the same diameter, and are opened into the shell-side space 15 at equally spaced intervals in the longitudinal direction.

The ammonia solution fed from the tube 8 and the ethylene oxide fed from the tube 19 are mixed and reacted effectively by the aid of the buffer plates 18 in the shell-side space 15.

The reaction product mixture is led from the top portion of the shell-side space 15 to the bottom space 32 of the reaction chamber 20 or the gas-liquid separating drum 12 or to both through the conduit 16 by the pressure-reducing operation of pressure control valve 17a. The reaction product mixture fed to the bottom space 32, which contains the vapor generated at the time of pressure-reducing, is then introduced into the tube-side space 13 where it boils by absorbing the heat of reaction generated by the reaction of ethylene oxide and ammonia in the shell-side space 15. The boiling reaction product mixture in the gas-liquid mixed state rises through the tube-side space 13 and is sent to a gas-liquid separating drum 12.

The vapor separated in the gas-liquid separating drum 12, which is a mixture consisting mainly of ammonia vapor and steam, is sent to an ammonia absorption tower (C) through a conduit 22, an ammonia condenser 23 which is cooled by cooling water at 30° C. or below, a conduit 24, and a conduit 25.

Ammonia solution thus obtained is again used as reacting material.

A part of the liquid separated in the gas-liquid separating drum 12 is circulated by a thermosophoning action through a circulating tube 14, the bottom space 32 and the tube-side space 13. The remainder is sent through a conduit 26 to an ammonia desorption tower (B) equipped with a reboiler 28 and a tube 2a for introducing heat-transfer medium.

The ammonia vapor desorbed in the ammonia desorption tower (B) is sent from the top of the tower to the ammonia condenser 23 through a conduit 30. The liquid left over after the desorption of the ammonia vapor is sent through a conduit 31 from the bottom of the tower to a step (not shown in the drawing) of purifying the ethanolamines.

According to the process of this invention, the vapor generated at the time of pressure-reducing the reaction product mixture and the vapor evolved at the time of sending the reaction product mixture upwardly through the tube-side space 13 can be easily separated from the liquid in the gas-liquid separating drum 12, and the amount of ammonia dissolved in the liquid can be minimized. For this reason, the amount of heat required to heat the liquid in the ammonia desorption tower (B) for desorption of ammonia vapor can be drastically reduced.

The following Example illustrates the performance of the process of this invention in the apparatus shown in the accompanying drawing.

EXAMPLE 1

Water was fed to the top stage of ammonia absorption tower (C) through conduit 2, and a 25% by weight aqueous solution of ammonia, to the middle stage of the tower (C) through conduit 3. A gas substantially free from ammonia was released from conduit 4. The liquid at the bottom of the ammonia absorption tower (C) was fed into the bottom portion of shell-side space 15 from ammonia solution-introducing tube 8 through conduits 5 and 6 and cooler 7. In the shell-side space, buffer plates 18 were provided horizontally at intervals of 10 cm, and the cooler 7 was cooled by cooling water at 30° C. or below. In the meanwhile, ethylene oxide was fed into the shell-side space 15 from 10 tubes 19 opened into the shell-side space 15 at equally spaced intervals in the longitudinal direction.

The reaction product mixture was fed from the top portion of the shell-side space 15 into the bottom space 32 of the reaction chamber 20 through conduit 16 and a preforated plate 21 while it was being partially vaporized by reducing the pressure through the operation of pressure control valve (17a).

The reaction product mixture was then sent from the bottom space 32 to the tube-side space 13. It went upward through the tube-side space 13 while containing the vapor generated by the absorption of the heat of reaction that occurred in the shell-side space 15 and the vapor generated at the time of partial vaporization. Thus, the reaction product mixture was sent to gas-liquid separating drum 12.

The vapor separated in the separating drum 12 was sent to the ammonia absorption tower (C) through conduit 22, ammonia condenser 23 (which is cooled by water at 30° C. or below), conduit 24 and conduit 25. Ammonia solution formed there was again used as a reacting material.

A part of the liquid separated in the gas-liquid separating drum 12 was circulated by a thermosiphoning action from circulating tube 14 to the gas-liquid separating drum 12 through the bottom space 32 and the tube-side space 13. The remainder was fed into the top of ammonia desorption tower (B) through conduit 26. In the meantime, saturated steam at 9 kg/cm$^2$.G was supplied into reboiler 28 to heat the bottom of the ammonia desorption tower (B).

The ammonia vapor desorbed in the ammonia desorption tower (B) was sent to ammonia condenser 23 through conduit 30. The liquid containing ethanolamines which was left after the desorption of the ammonia vapor was sent to a step of purifying the ethanolamines through conduit 31.

When the foregoing process was operated on such a scale that 1,500 tons of ethanolamine were produced per month, the flow rate of saturated steam at 9 kg/cm$^2$.G which had to be introduced through conduit 29 of reboiler 28 of the ammonia desorption tower (B) was 1,950 kg/hr. The triethanolamine separated in a customary manner from the liquid (an aqueous solution of MEA, DEA and TEA) discharged through conduit 31 has a color expressed by APHA of not more than 30.

The operating conditions for this process are shown in Tables 1 and 2.

Table 1

| | (temperature and pressure) | |
|---|---|---|
| | Temperature (° C.) | Pressure (kg/cm$^2$ · G) |
| Mixture in the shell-side space 15 | 110 | 30 |
| Mixture in the tube-side space 13 | 95 | 2.5 |
| Starting ammonia solution in the ammonia solution introducing tube 8 | 40 | 35 |

Table 2

| | (flow rate, kg/hr) | | | | |
|---|---|---|---|---|---|
| | In the ethylene oxide-introducing tube 19 | In the ammonia solution-introducing tube 8 | In the conduit 26 | In the conduit 31 | In the conduit 29 |
| Ammonia | — | 2280 | 700 | — | — |
| Water | — | 3730 | 3490 | 2690 | — |
| MEA | — | — | 810 | 810 | — |
| DEA | — | — | 750 | 750 | — |
| TEA | — | — | 640 | 640 | — |
| Ethylene oxide | 1770 | — | — | — | — |
| Saturated steam at 9 kg/cm$^2$ · G | — | — | — | — | 1950 |
| Total | 1770 | 6010 | 6390 | 4890 | 1950 |

What we claim is:

1. In a process for preparing ethanolamines by the reaction of ethylene oxide with ammonia in the liquid phase, the improvement comprising
   (1) reacting ammonia and ethylene oxide in a reaction zone;
   (2) passing the reaction mixture through pressure reducing means to reduce the pressure of said reaction mixture and partially vaporize the reaction mixture and feeding the partially vaporized reaction mixture to a space below the reaction zone;
   (3) passing the partially vaporized reaction mixture upwardly through the reaction zone to absorb heat of reaction and to further vaporize the reaction mixture;
   (4) feeding the further vaporized reaction mixture of step (3) to a gas-liquid separation zone for separation into a gas phase and a liquid phase;
   (5) passing one portion of the liquid phase to the space below said reaction zone whereby said portion mixes with the partially vaporized reaction mixture from step (2) and is passed therewith through said reaction zone in step (3) and returned to said gas-liquid separation zone;
   (6) passing the vapor phase to an ammonia absorber whereby the ammonia in said vapor phase is absorbed to form an ammonia solution which is fed to the reaction zone;
   (7) passing the remaining portion of the liquid phase to an ammonia desorber to recover ammonia and ethanolamine; and
   (8) feeding the recovered ammonia from the ammonia desorber to the ammonia desorber;
   whereby heat of reaction and unreacted ammonia are effectively recovered.

2. The improved process of claim 1 wherein the ammonia solution from the ammonia absorber is fed to the bottom portion of the reaction zone and the ethylene oxide is fed to the reaction zone at equally spaced intervals in the longitudinal direction.

3. In a process for preparing ethanolamines by the reaction of ethylene oxide with ammonia in the liquid phase, the improvement comprising
   (1) reacting ammonia and ethylene oxide in a reaction zone;
   (2) passing a portion of the reaction mixture through pressure-reducing means to reduce the pressure of said reaction mixture and partially vaporize the reaction mixture and feeding the partially vaporized reaction mixture to a space below the reaction zone;

(3) passing the remaining portion of said reaction mixture to a gas-liquid separation zone above said reaction zone for separation into a gas phase and a liquid phase;

(4) passing the partially vaporized reaction mixture upwardly through the reaction zone to absorb the heat of reaction and to further vaporize the reaction mixture;

(5) feeding the further vaporized reaction mixture to said gas-liquid separation zone;

(6) passing one portion of the liquid phase from said gas-liquid separation zone to the space below said reaction zone whereby said portion of the liquid phase mixes with the partially vaporized reaction mixture and is passed therewith through said reaction zone in step (4) and returned to said gas-liquid separation zone;

(7) passing the vapor phase to an ammonia absorber whereby the ammonia in said vapor phase is absorbed to form an ammonia solution which is fed to the reaction zone;

(8) passing the remaining portion of the liquid phase from said gas-liquid separation zone to an ammonia desorber to recover ammonia and ethanolamine; and (9) feeding the recovered ammonia from the ammonia desorber to the ammonia absorber;

whereby heat of reaction and unreacted ammonia are effectively recovered.

4. The improved process of claim 3 wherein the ammonia solution from the ammonia absorber is fed to the bottom portion of the reaction zone and the ethylene oxide is fed to the reaction zone at equally spaced intervals in the longuitudinal direction.

5. A reactor for the production of ethanolamines by the reaction of ethylene oxide with ammonia, said reactor comprising
a vertical multitube heat exchanger reaction chamber comprising
a shell plate defining a shell-side space,
top and bottom tube plates,
at least one vertical tube defining a tube-side space within said shell-side space and extending through said top and bottom tube plates, and
at least one buffer plate within said shell-side space;
a gas-liquid separating drum located over the top plate of said reaction chamber and in fluid flow communication with said tube-side space;
a bottom space below said bottom tube plate and in fluid flow communication with said tube-side space;
a circulating pipe connecting the gas-liquid separating drum and the bottom space;
an ammonia solution-introducing tube connected to the shell-side space of said reactor;
a plurality of ethylene oxide-introducing tubes connected to the shell-side space of said reactor;
a conduit connecting the shell-side space of the reaction chamber with the gas-liquid separating drum and the bottom space; and
a pressure control valve in said conduit.

6. The reactor of claim 5 which further comprises means for selectively controlling flow of fluid within said conduit to the gas liquid separating drum and the bottom space.

7. The reactor of claim 5 wherein the ammonia solution-introducing tube is opened into the bottom portion of the shell-side space.

8. The reactor of claim 5 wherein a plurality of ethylene oxide-introducing tubes are opened into the shell-side space at equally spaced intervals in the longitudinal direction.

* * * * *